US012361791B2

(12) United States Patent
Marsh et al.

(10) Patent No.: US 12,361,791 B2
(45) **Date of Patent: *Jul. 15, 2025**

(54) GAMING MACHINE AND METHOD FOR DISPLAYING A FREE SPIN COUNT-UP

(71) Applicant: Aristocrat Technologies Australia Pty Limited, North Ryde (AU)

(72) Inventors: David Marsh, Charlottesville, VA (US); Karl Roelofs, Charlottesville, VA (US); Michael P. Casey, Reno, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 282 days.

This patent is subject to a terminal disclaimer.

(21) Appl. No.: 18/048,334

(22) Filed: Oct. 20, 2022

(65) Prior Publication Data

US 2023/0108580 A1 Apr. 6, 2023

Related U.S. Application Data

(63) Continuation of application No. 17/091,740, filed on Nov. 6, 2020, now Pat. No. 11,482,077, which is a (Continued)

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/3246* (2013.01); *G07F 17/3251* (2013.01); *G07F 17/34* (2013.01)

(58) Field of Classification Search
CPC ............. G07F 17/3267; G07F 17/3213; G07F 17/3246; G07F 17/3251; G07F 17/34; G07F 17/3258; G07F 17/3223
See application file for complete search history.

(56) References Cited

U.S. PATENT DOCUMENTS

| | | | |
|---|---|---|---|
| 5,971,849 | A | 10/1999 | Falciglia |
| 6,146,271 | A | 11/2000 | Kadlic |
| 6,234,897 | B1 | 5/2001 | Frohm |
| 6,299,165 | B1 | 10/2001 | Nagano |
| 6,582,305 | B1 | 6/2003 | Carter |
| 6,626,758 | B1 | 9/2003 | Parham |

(Continued)

FOREIGN PATENT DOCUMENTS

| | | | |
|---|---|---|---|
| AU | 2004202643 | B2 | 1/2005 |
| AU | 2007231800 | B2 | 5/2012 |

(Continued)

OTHER PUBLICATIONS

Office Action dated Mar. 21, 2024 for U.S. Appl. No. 18/348,577 (pp. 1-7).

(Continued)

*Primary Examiner* — Yingchuan Zhang
(74) *Attorney, Agent, or Firm* — Armstrong Teasdale LLP

(57) ABSTRACT

An electronic gaming machine includes a display, a credit input mechanism, and a processor configured to perform operations comprising: (i) initiating a free play bonus game; (ii) awarding, during the free play bonus game, a plurality of free spins of a plurality of reels; (iii) displaying, on the display, a plurality of numerical indicia, the plurality of numerical indicia displayed one at a time and increasing from an initial numerical indicium associated with an initial free spin to a final numerical indicium associated with a final free spin; and (iv) providing a game award in conjunction with the final free spin.

20 Claims, 8 Drawing Sheets

Related U.S. Application Data continuation of application No. 15/951,802, filed on Apr. 12, 2018, now Pat. No. 10,957,159.

(56) References Cited

U.S. PATENT DOCUMENTS 7,052,395 B2 5/2006 Glavich
7,097,560 B2 8/2006 Okada
7,166,028 B2 1/2007 Fasbender
7,300,351 B2 11/2007 Thomas
7,632,184 B2 12/2009 Gauselmann
7,704,137 B2 4/2010 Englman
7,740,245 B2 6/2010 Tarantino
7,749,072 B1 7/2010 Singer
7,846,018 B2 12/2010 Baerlocher
7,938,719 B2 5/2011 Fasbender
7,993,195 B2 8/2011 Belger
8,287,367 B2 10/2012 Hall
8,323,094 B2 12/2012 Palermo
8,454,429 B2 6/2013 Jaffe
8,506,380 B2 8/2013 Hughes
8,506,386 B2 8/2013 Harris
8,696,436 B2 4/2014 Acres
8,708,806 B2 4/2014 Wabschall
9,017,160 B2 4/2015 Moroney
9,064,383 B2 6/2015 Palermo
9,728,043 B2 8/2017 Acres
9,959,708 B2 5/2018 Caputo
10,614,666 B2 4/2020 Eubanks
11,043,075 B2 6/2021 Eubanks
11,423,744 B2 8/2022 Eubanks
11,769,374 B2 9/2023 Eubanks
2002/0010016 A1 1/2002 Tsukahara
2002/0086725 A1 7/2002 Fasbender
2002/0155880 A1 10/2002 Glavich
2003/0032470 A1 2/2003 Weiss
2003/0060276 A1 3/2003 Walker
2003/0064797 A1 4/2003 Jackson
2003/0114217 A1 6/2003 Walker
2003/0125100 A1 7/2003 Cannon
2003/0236118 A1 12/2003 Okada
2004/0023709 A1 2/2004 Beaulieu
2004/0033827 A1 2/2004 Gilmore
2004/0053666 A1 3/2004 Vancura
2004/0082384 A1 4/2004 Walker
2004/0087360 A1 5/2004 Chamberlain
2004/0242320 A1 12/2004 Jackson
2004/0259627 A1 12/2004 Walker
2004/0266516 A1 12/2004 Thomas
2005/0060050 A1 3/2005 Baerlocher
2005/0075156 A1 4/2005 Seelig
2005/0075163 A1 4/2005 Cuddy
2005/0153769 A1 7/2005 Casey
2005/0187005 A1 8/2005 Rose
2006/0068903 A1 3/2006 Walker
2006/0079313 A1 4/2006 Trainor
2006/0111172 A1 5/2006 Walker
2006/0199634 A1 9/2006 Anderson
2006/0223632 A1 10/2006 Walker
2006/0244211 A1 11/2006 Osawa
2006/0247006 A1 11/2006 Inamura
2006/0247007 A1 11/2006 Inamura
2007/0167211 A1 7/2007 Rodgers
2007/0202943 A1 8/2007 Thomas
2007/0293297 A1 12/2007 Schugar
2008/0102916 A1 5/2008 Kovacs
2008/0108431 A1 5/2008 Cuddy
2008/0113734 A1 5/2008 Watkins
2008/0113777 A1 5/2008 Anderson
2008/0318656 A1 12/2008 Walker
2009/0017897 A1* 1/2009 Fujimoto ............ G07F 17/3267 463/20
2009/0124332 A1 5/2009 Baerlocher
2009/0124346 A1 5/2009 Baerlocher
2009/0197664 A1 8/2009 Schultz
2009/0200740 A1 8/2009 Falciglia, Sr.
2009/0239601 A1 9/2009 Macke
2009/0275382 A1 11/2009 Vallejo et al.
2009/0275387 A1 11/2009 Yoshizawa
2010/0029364 A1 2/2010 Zielinski
2010/0056248 A1 3/2010 Acres
2010/0120492 A1 5/2010 Davis
2010/0120525 A1 5/2010 Baerlocher
2010/0124971 A1 5/2010 Baerlocher
2010/0137056 A1* 6/2010 Hoffman ................. G07F 17/32 463/43
2011/0045892 A1 2/2011 Vann
2011/0059791 A1 3/2011 Tarantino
2011/0118001 A1 5/2011 Vann
2011/0118006 A1 5/2011 Acres
2011/0124400 A1 5/2011 Scholtz
2011/0130198 A1 6/2011 Van Linden
2011/0244935 A1 10/2011 Matthews
2011/0269548 A1 11/2011 Barclay
2012/0034967 A1 2/2012 Owen
2012/0061150 A1 3/2012 Coulombe
2012/0122543 A1 5/2012 Watkins
2012/0157195 A1 6/2012 Sum
2012/0172108 A1 7/2012 Acres
2012/0172130 A1 7/2012 Acres
2012/0270638 A1 10/2012 Eubanks
2013/0005446 A1 1/2013 Englman
2013/0065663 A1 3/2013 Johnson
2013/0065665 A1 3/2013 Watkins
2013/0157756 A1 6/2013 Hall
2014/0087829 A1 3/2014 Watkins
2014/0094303 A1 4/2014 Wabschall
2014/0179396 A1 6/2014 Aoki
2014/0221071 A1 8/2014 Calio
2014/0302909 A1 10/2014 Meyer
2014/0323192 A1 10/2014 Keilwert
2014/0342802 A1 11/2014 Itagaki
2014/0349732 A1 11/2014 Pawloski
2015/0018070 A1 1/2015 Meyer
2015/0045106 A1 2/2015 You
2015/0087382 A1 3/2015 Gilbertson
2015/0221176 A1 8/2015 Meyer
2015/0228163 A1 8/2015 Clarebrough
2015/0302482 A1 10/2015 Vagner
2015/0356813 A1 12/2015 Mead
2015/0379809 A1 12/2015 Clarebrough
2016/0049050 A1 2/2016 Berman
2016/0358412 A1 12/2016 Eaton
2017/0024970 A1 1/2017 Sherrets
2017/0032609 A1* 2/2017 Inamura .............. G07F 17/3211
2017/0032611 A1 2/2017 Luong
2017/0092071 A1 3/2017 Cuddy
2017/0124805 A1 5/2017 Prabhu
2017/0178460 A1* 6/2017 Berman .............. G07F 17/3211
2017/0301175 A1 10/2017 Acres
2017/0301177 A1 10/2017 Pawloski
2019/0318579 A1 10/2019 Marsh
2020/0265681 A1 8/2020 Eubanks
2020/0265682 A1 8/2020 Eubanks
2021/0312762 A1 10/2021 Eubanks
2022/0406142 A1 12/2022 Eubanks
2023/0306821 A1 9/2023 Eubanks

FOREIGN PATENT DOCUMENTS

AU 2011285816 B2 4/2015
AU 2016234913 A1 4/2017
EP 2219161 A1 8/2010
GB 2336233 A 10/1999
JP 2016202587 A 12/2016
KR 20100136672 A 12/2010

OTHER PUBLICATIONS

Notice of Allowance dated Apr. 5, 2024 for U.S. Appl. No. 18/328,068 (pp. 1-8).
Australian Examination Report No. 1 issued in App. No. AU2019213428, dated May 1, 2024, 3 pages.

(56) References Cited

OTHER PUBLICATIONS

Notice of Allowance dated Jun. 4, 2020 for U.S. Appl. No. 16/100,851 (pp. 1-7).
Office Action dated Oct. 28, 2020 for U.S. Appl. No. 16/841,290 (pp. 1-17).
Notice of Allowance dated Sep. 25, 2020 for U.S. Appl. No. 16/100,851 (pp. 1-5).
Notice of Allowance dated Sep. 3, 2020 for U.S. Appl. No. 15/951,802 (pp. 1-8).
Office Action dated Feb. 4, 2021 for U.S. Appl. No. 16/841,290 (pp. 1-8).
Notice of Allowance dated Feb. 24, 2021 for U.S. Appl. No. 16/841,290 (pp. 1-9).
Office Action dated Jan. 25, 2021 for U.S. Appl. No. 16/841,337 (pp. 1-11).
Office Action dated Feb. 5, 2021 for U.S. Appl. No. 16/122,592 (pp. 1-9).
Australian Examination Report No. 1 for App. No. AU2016234913, dated Feb. 9, 2021, 4 pages.
Notice of Allowance dated Apr. 28, 2021 for U.S. Appl. No. 16/122,592 (pp. 1-9).
Notice of Allowance dated Feb. 24, 2021 for U.S. Appl. No. 16/841,337 (pp. 1-9).
Office Action (Non-Final Rejection) dated Apr. 14, 2022 for U.S. Appl. No. 17/347,279 (pp. 1-8).
Office Action (Non-Final Rejection) dated Sep. 10, 2021 for U.S. Appl. No. 17/069,564 (pp. 1-11).
Office Action (Non-Final Rejection) dated Feb. 8, 2022 for U.S. Appl. No. 17/091,740 (pp. 1-14).
Office Action (Notice of Allowance and Fees Due (PTOL-85)) dated Mar. 24, 2022 for U.S. Appl. No. 17/069,564 (pp. 1-9).
Office Action (Non-Final Rejection) dated Mar. 24, 2022 for U.S. Appl. No. 17/104,390 (pp. 1-6).
Office Action (Notice of Allowance and Fees Due (PTOL-85)) dated May 10, 2022 for U.S. Appl. No. 17/347,279 (pp. 1-8).
Office Action (Notice of Allowance and Fees Due (PTOL-85)) dated Jun. 17, 2022 for U.S. Appl. No. 17/104,390 (pp. 1-8).
Office Action (Notice of Allowance and Fees Due (PTOL-85)) dated Jul. 7, 2022 for U.S. Appl. No. 17/091,740 (pp. 1-5).
Australian Examination Report No. 1 issued in App. No. AU2022200674, dated Dec. 20, 2022, 4 pages.
Office Action (Non-Final Rejection) dated Feb. 16, 2023 for U.S. Appl. No. 17/872,947 (pp. 1-6).
Office Action (Notice of Allowance and Fees Due (PTOL-85)) dated Apr. 5, 2023 for U.S. Appl. No. 17/872,947 (pp. 1-8).
Office Action (Non-Final Rejection) dated Apr. 27, 2023 for U.S. Appl. No. 17/892,674 (pp. 1-9).
Office Action (Notice of Allowance and Fees Due (PTOL-85)) dated Jun. 14, 2023 for U.S. Appl. No. 17/892,674 (pp. 1-8).
Office Action (Notice of Allowance and Fees Due (PTOL-85)) dated Jun. 26, 2023 for U.S. Appl. No. 17/409,440 (pp. 1-8).
Office Action (Non-Final Rejection) dated Sep. 28, 2023 for U.S. Appl. No. 18/048,337 (pp. 1-7).
Office Action (Non-Final Rejection) dated Dec. 21, 2023 for U.S. Appl. No. 18/328,068 (pp. 1-18).
Office Action (Notice of Allowance and Fees Due (PTOL-85)) dated Dec. 21, 2023 for U.S. Appl. No. 18/048,337 (pp. 1-5).
Australian Examination Report No. 1 issued in App. No. AU2023278048, dated Sep. 11, 2024, 4 pages.
Office Action (Non-Final Rejection) dated Sep. 27, 2024 for U.S. Appl. No. 18/436,840 (pp. 1-8).
Australian Examination Report No. 2 issued in App. No. AU2019202557, dated Jan. 23, 2025, 2 pages.

* cited by examiner

GAMING MACHINE AND METHOD FOR DISPLAYING A FREE SPIN COUNT-UP

CROSS-REFERENCE TO RELATED APPLICATIONS

This application is a continuation of and claims priority to U.S. patent application Ser. No. 17/091,740, filed Nov. 6, 2020, which is a continuation of U.S. patent application Ser. No. 15/951,802, now U.S. Pat. No. 10,957,159, filed Apr. 12, 2018, the contents of which are hereby incorporated by reference in their entireties.

TECHNICAL FIELD

The field of disclosure relates generally to electronic gaming, and more particularly to an electronic gaming machine and method that awards a plurality of free spins and displays a free spin count-up in a bonus game triggered from the primary game, starting from a first free spin and building towards a final free spin.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix." Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

Many conventional gaming machines are also configured to present a base or primary game as well as a bonus or secondary game, which may be triggered from the primary game, such as, for example, based upon the occurrence of a winning pattern of symbols occurring in the primary game. Many types of bonus games have been devised. However, new and exciting bonus games are desirable and player demand for such games continues undiminished.

BRIEF DESCRIPTION

In one embodiment, an electronic gaming machine is provided. The electronic gaming machine includes a display, a credit input mechanism, and a processor configured to perform operations comprising: (i) determining, during a wagering game initiated in response to receiving a credit wager, that a free play trigger condition is satisfied, the wagering game including a plurality of reels; (ii) initiating, in response to the free play trigger condition, a free play bonus game; (iii) determining a number of free spins of the plurality of reels for use in the free play bonus game; (iv) displaying, on the display, an initial numerical indicium associated with an initial free spin of the number of free spins; (v) sequentially counting up, on the display, from the initial numerical indicium to a final numerical indicium associated with a final free spin of the number of free spins; and (vi) providing, in response and in conjunction with the display of the final numerical indicium, a game award.

In another embodiment, an electronic gaming machine is provided. The electronic gaming machine includes a display, a credit input mechanism, and a processor configured to perform operations comprising: (i) initiating a free play bonus game; (ii) awarding, during the free play bonus game, a plurality of free spins of a plurality of reels; (iii) displaying, on the display, a plurality of numerical indicia, the plurality of numerical indicia displayed one at a time and increasing from an initial numerical indicium associated with an initial free spin to a final numerical indicium associated with a final free spin; and (iv) providing a game award in conjunction with the final free spin.

In yet another embodiment, a method of electronic gaming implemented on an electronic gaming machine is provided. The method includes: (i) initiating a free play bonus game; (ii) awarding, during the free play bonus game, a plurality of free spins of a plurality of reels; (iii) displaying, on a display, a plurality of numerical indicia, the plurality of numerical indicia displayed one at a time and increasing from an initial numerical indicium associated with an initial free spin to a final numerical indicium associated with a final free spin; and (iv) providing a game award in conjunction with the final free spin.

BRIEF DESCRIPTION OF THE DRAWINGS

An example embodiment of the subject matter disclosed will now be described with reference to the accompanying drawings.

DETAILED DESCRIPTION

An electronic gaming machine is described herein, in which a free play bonus game may be triggered from a primary reel game. Specifically, a number of winning bingo patterns may be determined in the primary game, and the free play bonus game may be triggered if the number of winning patterns exceeds a threshold number of winning patterns. Once the free play bonus game is triggered, a number of free spins may be provided to the player, each causing a free spin, or re-spin of the reels displayed in the primary game. If the number of free spins provided to the player meets or exceeds a threshold number of free spins, which may be the same as or different from the number of winning patterns needed to trigger the free spin bonus game, a game award, such as a progressive jackpot may be provided to the player. In addition, a numerical indicium may be displayed on a secondary display of the electronic gaming machine. The numerical indicium may count-up from an initial free spin to a final free spin, one free spin at a time, and each time the reels are re-spun, to build player excitement and signify progress towards the progressive jackpot.

As used herein, the terms "primary game" and "base game" may refer to games initiated in response to one of a plurality of game initiation events, such as a wager or credit being received by or transferred to an EGM, as described herein. A primary game may be associated with a primary game outcome represented by a plurality of primary game symbols or primary game reels, each of which may include a plurality of primary game symbols, and each of which may be selected based upon a random number generated by a random number generator.

Further, as used herein, the terms "secondary game" and "bonus game" may refer generally to a game or a component of a game involving procedures in addition to the primary game. In some embodiments, a bonus game may be triggered from a primary game and may be associated with a bonus game outcome, which may be different from the primary game outcome. For example, a bonus game may be initiated after, or during, a primary game and in response to the occurrence of a particular condition, such as a "trigger condition" occurring during the primary game. A bonus game may result in a bonus game outcome or bonus award that increases a primary game award or adds a bonus game award to a primary game award.

Figure 1:
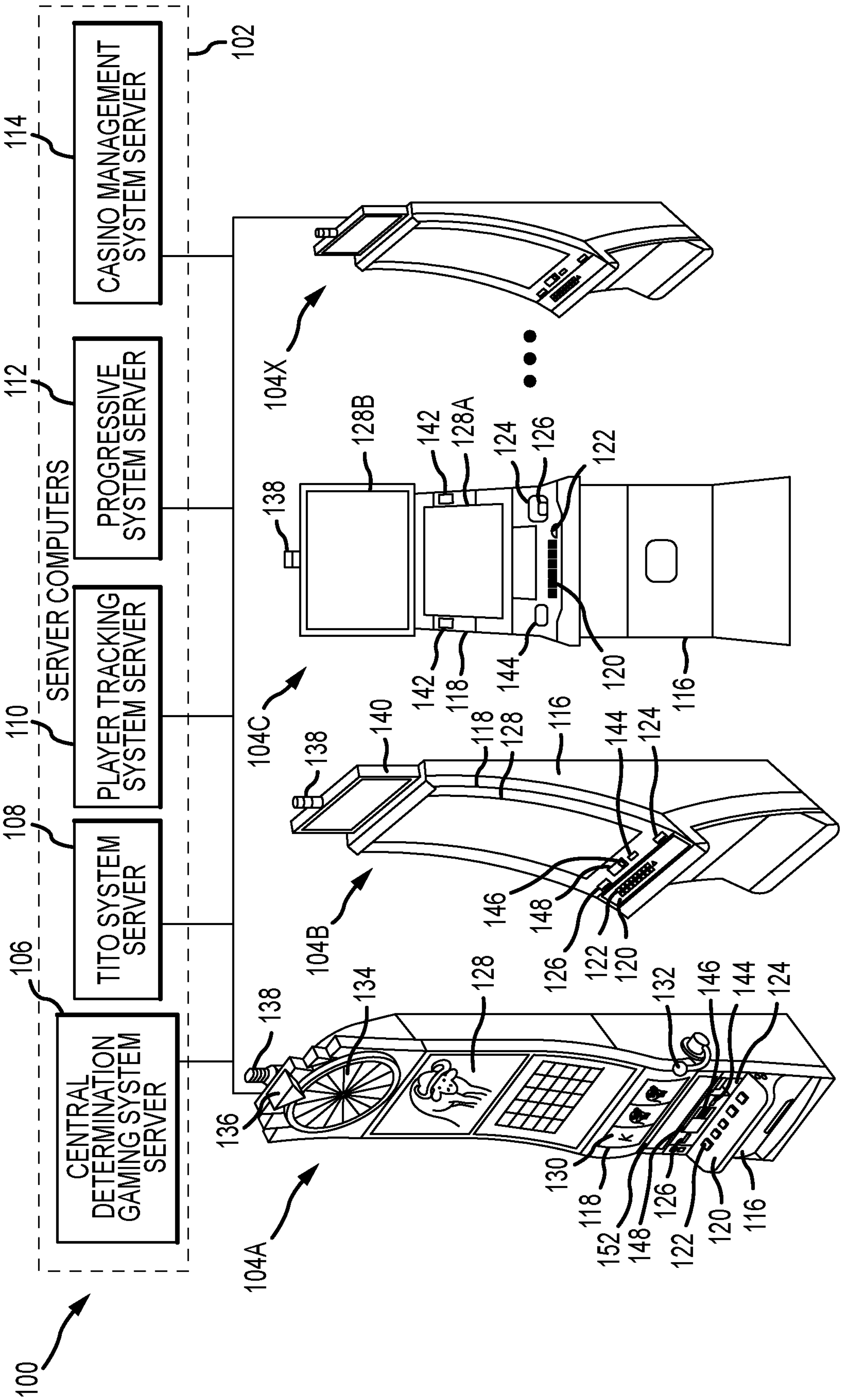
FIG. 1 is a diagram of exemplary EGMs networked with various gaming-related servers.

FIG. 1 is a diagram of exemplary EGMs networked with various gaming-related servers in a gaming system 100. Gaming system 100 operates in a gaming environment, including one or more servers, or server computers, such as slot servers of a casino, that are in communication, via a communications network, with one or more EGMs, or gaming devices 104A-104X, such as EGMs, slot machines, video poker machines, or bingo machines, for example. Gaming devices 104A-104X may, in the alternative, be portable and/or remote gaming devices such as, for example, and without limitation, a smart phone, a tablet, a laptop, or a game console.

Communication between gaming devices 104A-104X and servers 102, and among gaming devices 104A-104X, may be direct or indirect, such as over the Internet through a web site maintained by a computer on a remote server or over an online data network including commercial online service providers, Internet service providers, private networks, and the like. In other embodiments, gaming devices 104A-104X communicate with one another and/or servers 102 over wired or wireless RF or satellite connections and the like.

In certain embodiments, servers 102 may not be necessary and/or preferred. For example, the present invention may, in one or more embodiments, be practiced on a stand-alone gaming device such as gaming device 104A and/or gaming device 104A in communication with only one or more other gaming devices 104B-104X (i.e., without servers 102).

Servers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, a game outcome may be generated on a central determination gaming system server 106 and then transmitted over the network to any of a group of remote terminals or remote gaming devices 104A-104X that utilize the game outcome and display the result to the player.

Gaming device 104A is often of a cabinet construction that may be aligned in rows or banks of similar devices for placement and operation on a casino floor. The gaming device 104A often includes a main door 116 that provides access to the interior of the cabinet. Gaming device 104A typically includes a button area or button deck 120 accessible by a player that is configured with input switches or buttons 122, a bill validator 124, and/or ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 including a plurality of mechanical reels 130, typically 3 or 5 mechanical reels, with various symbols displayed there on. Reels 130 are then independently spun and stopped to show a set of symbols within the gaming display area 118 that may be used to determine an outcome to the game.

In many configurations, gaming machine 104A may have a main display 128 (e.g., video display monitor) mounted to, or above, gaming display area 118. Main display 128 may be, for example, a high-resolution LCD, plasma, LED, or OLED panel that may be flat or curved as shown, a cathode ray tube, or other conventional electronically controlled video monitor.

In certain embodiments, bill validator 124 may also function as a "ticket-in" reader that enables the player to use a casino-issued credit ticket to load credits onto gaming device 104A (e.g., in a cashless TITO system). In such cashless embodiments, gaming device 104A may also include a "ticket-out" printer 126 for outputting a credit ticket when a "cash out" button is pressed. Cashless ticket systems are well known in the art and are used to generate and track unique bar-codes printed on tickets to allow players to avoid the use of bills and coins by loading credits using a ticket reader and cashing out credits using ticket-out printer 126 on gaming device 104A.

In certain embodiments, a player tracking card reader 144, a transceiver for wireless communication with a player's smartphone, a keypad 146, and/or an illuminated display 148 for reading, receiving, entering, and/or displaying player tracking information can be provided. In such embodiments, a game controller within gaming device 104A communicates with player tracking server system 110 to send and receive player tracking information.

Gaming device 104A may also include, in certain embodiments, a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but could also be incorporated into play of the base game, or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

In certain embodiments, there may also be one or more information panels 152 that may be, for example, a back-lit silkscreened glass panel with lettering to indicate general game information including, for example, a game denomination (e.g., $0.25 or $1), pay lines, pay tables, and/or various game related graphics. In some embodiments, information panels 152 may be implemented as an additional video display.

Gaming device 104A traditionally includes a handle 132 typically mounted to the side of main cabinet 116 that may be used to initiate game play.

Figure 2:
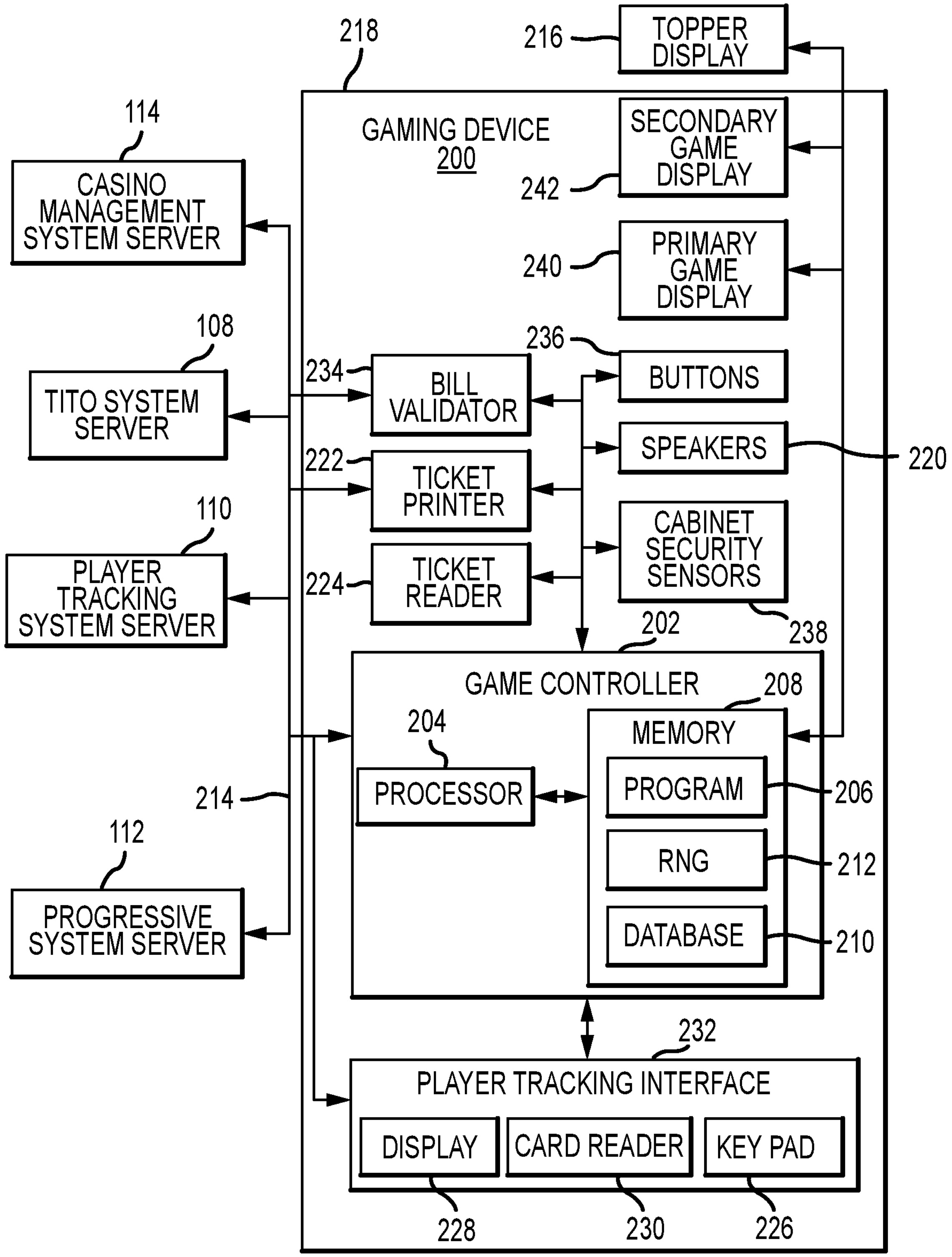
FIG. 2 is a block diagram of an exemplary EGM.

Many or all of the above described components may be controlled by circuitry (e.g., a gaming controller) housed inside main cabinet 116 of gaming device 104A, the details of which are shown in FIG. 2.

Not all gaming devices suitable for implementing embodiments of the gaming systems, gaming devices, or methods described herein necessarily include top wheels, top boxes, information panels, cashless ticket systems, and/or player tracking systems. Further, some suitable gaming devices have only a single game display that includes only a mechanical set of reels and/or a video display, while others are designed, for example, for bar tables or table tops and have displays that face upwards.

Exemplary gaming device 104B shown in FIG. 1 is an Arc™ model gaming device manufactured by Aristocrat® Technologies, Inc. Where possible, reference numeral identifying similar features of gaming device 104A are also identified in gaming device 104B using the same reference numerals. Gaming device 104B, however, does not include physical reels 130 and instead shows game play and related game play functions on main display 128. An optional topper screen 140 may be included as a secondary game display for bonus play, to show game features or attraction activities while the game is not in play, or any other information or media desired by the game designer or operator. In some embodiments, topper screen 140 may also or alternatively be used to display progressive jackpot prizes available to a player during play of gaming device 104B.

Gaming device 104B includes main cabinet 116 having main door 118 that opens to provide access to the interior of gaming device 104B. Main door 118, or service door, is typically used by service personnel to refill ticket-out printer 126 and collect bills and tickets inserted into bill validator 124. Main door 118 may further be accessed to reset the machine, verify and/or upgrade the software, and for general maintenance operations.

Exemplary gaming device 104C shown in FIG. 1 is a Helix™ model gaming device manufactured by Aristocrat® Technologies, Inc. Gaming device 104C includes a main display 128A that is in a landscape orientation. Although not illustrated by the front view illustrated in FIG. 1, landscape display 128A has a curvature radius from top to bottom. In certain embodiments, display 128A is a flat panel display. Main display 128A is typically used for primary game play while a secondary display 128B is used for bonus game play, to show game features or attraction activities while the game is not in play, or any other information or media desired by the game designer or operator.

Many different types of games, including mechanical slot games, video slot games, video poker, video black jack, video pachinko, keno, bingo, and lottery, may be provided with or implemented within gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, Class II, or Class III, etc.

FIG. 2 is a block diagram of an exemplary gaming device 200, or EGM, connected to various external systems, including TITO system server 108, player tracking system server 110, progressive system server 112, and casino management system server 114. All or parts of gaming device 200 may be embodied in game devices 104A-104X shown in FIG. 1. The games conducted on gaming device 200 are controlled by a game controller 202 that includes one or more processors 204 and a memory 208 coupled thereto. Games are represented by game software or a game program 206 stored on memory 208. Memory 208 includes one or more mass storage devices or media housed within gaming device 200. One or more databases 210 may be included in one or more databases 210 for use by game program 206. A random number generator (RNG) 212 is implemented in hardware and/or software and is used, in certain embodiments, to generate random numbers for use in operation of gaming device 200 to conduct game play and to ensure the game play outcomes are random and meet regulations for a game of chance.

Alternatively, a game instance, or round of play of the game, may be generated on a remote gaming device such as central determination gaming system server 106, shown in FIG. 1. The game instance is communicated to gaming device 200 via a network 214 and is then displayed on gaming device 200. Gaming device 200 executes game software to enable the game to be displayed on gaming device 200. In certain embodiments, game controller 202 executes video streaming software that enables the game to be displayed on gaming device 200. Game software may be loaded from memory 208, including, for example, a read only memory (ROM), or from central determination gaming system server 106 into memory 208. Memory 208 includes at least one section of ROM, random access memory (RAM), or other form of storage media that stores instructions for execution by processor 204.

Gaming device 200 includes a topper display 216. In an alternative embodiment, gaming device 200 includes another form of a top box such as, for example, a topper wheel, or other topper display that sits on top of main cabinet 218. Main cabinet 218 or topper display 216 may also house various other components that may be used to add features to a game being played on gaming device 200, including speakers 220, a ticket printer 222 that prints bar-coded tickets, a ticket reader 224 that reads bar-coded tickets, and a player tracking interface 232. Player tracking interface 232 may include a keypad 226 for entering player tracking information, a player tracking display 228 for displaying player tracking information (e.g., an illuminated or video display), a card reader 230 for receiving data and/or communicating information to and from media or a device such as a smart phone enabling player tracking. Ticket printer 222 may be used to print tickets for TITO system server 108. Gaming device 200 may further include a bill validator 234, buttons 236 for player input, cabinet security sensors 238 to detect unauthorized opening of main cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered and time of play) for individual players so that an operator may reward players in a loyalty program. The player may use player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by casino management system server 114.

Gaming devices, such as gaming devices 104A-104X and 200, are highly regulated to ensure fairness and, in many cases, gaming devices 104A-104X and 200 are operable to award monetary awards (e.g., typically dispensed in the form of a redeemable voucher). Therefore, to satisfy security and regulatory requirements in a gaming environment, hardware and software architectures are implemented in gaming devices 104A-104X and 200 that differ significantly from those of general-purpose computers. Adapting general purpose computers to function as gaming devices 200 is not simple or straightforward because (1) regulatory requirements for gaming devices, (2) harsh environments in which gaming devices operate, (3) security requirements, and (4) fault tolerance requirements. These differences require substantial engineering effort and often additional hardware.

When a player wishes to play gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances of the game. The credit balance is decreased by the amount of each wager and increased upon a win. The player can add additional credits to the balance at any time. The player may also optionally insert a loyalty club card into card reader 230. During the game, the player views the game outcome on game displays 240 and 242. Other game and prize information may also be displayed.

For each game instance, a player may make selections that may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using player-input buttons 236, primary game display 240, which may include a touch screen, or using another suitable device that enables a player to input information into gaming device 200.

During certain game events, gaming device 200 may display visual and auditory effects that can be perceived by the player. These effects add to the excitement of a game, which makes a player more likely to continue playing. Auditory effects include various sounds that are projected by speakers 220. Visual effects include flashing lights, strobing lights, or other patterns displayed from lights on gaming device 200 or from lights behind information panel 152, shown in FIG. 1.

When the player wishes to stop playing, he/she cashes out the credit balance (typically by pressing a cash out button to receive a ticket from ticket printer 222). The ticket may be "cashed-in" for money or inserted into another machine to establish a credit balance for play.

Figure 3:
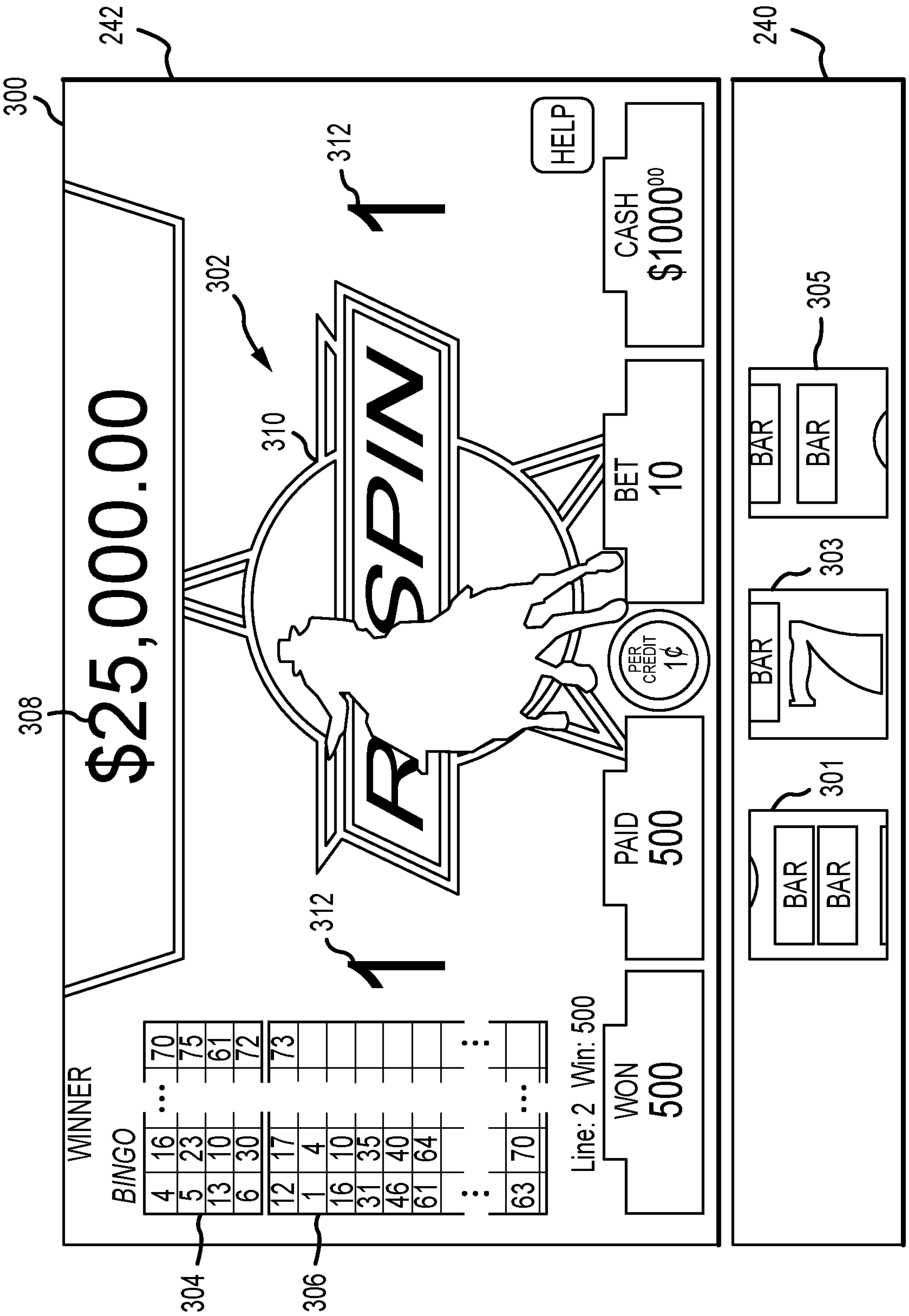
FIG. 3 is a schematic diagram of an exemplary free play bonus game played on an EGM shown at FIG. 1, in which an initial numerical indicium is displayed.

FIG. 3 is a schematic diagram of an exemplary free play bonus game 300 played on an EGM 104A-104X (shown at FIGS. 1 and 2). In various embodiments, free play bonus game 300 may be played as a primary or base game and/or as a bonus game that is triggered from the primary game. In other words, the functionality described herein with respect to free play bonus game 300 may be implemented in any suitable wagering game, including in any primary game as well as in any bonus game. However, in the illustrated embodiment, free play bonus game 300 is a bonus game.

Accordingly, a wagering game may be initiated on an EGM 104A-104X. Specifically, a player may fund the wagering game via bill validator 234 and/or ticket reader 224. Once funded, a primary game, which may include a plurality of reels 301, 303, and/or 305, each including a plurality of symbols, may appear on a display, such as on primary game display 240. These reels 301-305 may be physical reels and/or virtual reels and may range from one reel to five or more reels in number. As used herein, physical reels are mechanical in nature and may be physically rotated during gameplay. In contrast, virtual reels are rendered or visually created by game controller 202 on a display, such as primary game display 240, and are merely animated to give the appearance of being spun.

In various embodiments, the wagering game may include any suitable game of chance. For example, in at least some embodiments, the wagering game is a Class II bingo game. However, in other embodiments, the wagering game may be a Class III "Las Vegas Style" wagering game. Specific details of the type of wagering game used are not central to an understanding of the present disclosure. However, additional detail related to at least one embodiment (e.g., an embodiment employing a bingo-based or Class II primary game) may be obtained with reference to U.S. Published Patent Application No. 2012/0270638, filed Apr. 20, 2011, and entitled GAMING MACHINE WITH FREE PLAY BONUS MODE PRESENTING ONLY WINNING OUTCOMES, which is hereby incorporated by reference in its entirety.

During play of the primary game, game controller 202 may determine that a free play trigger condition is satisfied, and, in response, initiate free play bonus game 300. In various embodiments, a free play trigger condition may include any suitable trigger condition, such as, for example, generation by RNG 212 of a random number within a range of random numbers and/or a specific or preselected symbol combination occurring on the reels in the primary game. For example, in a Class III embodiment, the free play trigger condition may be satisfied when a preselected or predefined symbol combination occurs on reels 301-305 in the primary game, such as, for example, a symbol combination associated with a game award that is greater than or equal to a predetermined award value and/or when the predetermined award value is capable of being broken up or segmented into a threshold number of free spins.

In some embodiments, and as described in additional detail below, the free play trigger condition may be satisfied when a number of winning patterns in a bingo-based primary game (e.g., a Class II embodiment) exceeds a threshold number of winning patterns. In other embodiments, the free play trigger condition may be satisfied when an award associated with a bingo winning pattern is greater than or equal to a predetermined award value and/or when the predetermined award value is capable of being broken up or segmented into a threshold number of free spins. It will, however, be appreciated that these free play trigger conditions are merely exemplary and that other free play trigger conditions may be implemented as well.

When free play bonus game 300 is initiated, game controller 202 may award one or more free spins of the reels displayed in the primary game. The number of free spins awarded may be based upon any suitable criterion or group of criteria, such as, for example, the value of the random number generated by RNG 212, the symbol combination occurring on reels 301-305 during the primary game, and the like.

In addition, and in at least one embodiment (e.g., where the wagering game is a bingo game), the number of free spins awarded may correspond to a number of winning bingo patterns occurring in the primary game. For example, a bingo card provided in the primary game may be evaluated against a ball call to determine that the bingo card includes a number of winning patterns. Each winning pattern may be awarded as, or result in, a free spin in free play bonus game 300. As an example, a bingo card provided in the primary game may be evaluated against a ball call to determine that there are eight winning patterns occurring on the bingo card, and each of these eight winning patterns may result in an individual free spin in free play bonus game 300, such that, in this case, eight free spins are awarded. In addition, as described herein, free play bonus game 300 may not be triggered unless the number of winning patterns awarded in the primary game exceeds a threshold number of winning patterns, such as, for example four winning patterns, eight winning patterns, etc.

In another Class II embodiment, the number of free spins awarded may correspond to a number of segments or portions of a subdivided bingo game award. For example, when the free play trigger condition is satisfied by a bingo game award of sufficient value (as described above), the bingo game award may be subdivided into a plurality of smaller awards, each of which may be associated with a free spin. As an example, a bingo game award of 1,000 credits may be subdivided into eight smaller awards of 125 credits each. Each of the eight smaller awards may be associated with an individual free spin, and each of these individual free spins may, as described herein, provide or award one of the eight smaller awards.

In at least one Class III embodiment, the number of free spins awarded may correspond to a number of segments or portions of a subdivided game award in the Class III base game. For example, when the free play trigger condition is satisfied by a primary game award of sufficient value (as described above), the game award may be subdivided into a plurality of smaller awards, each of which may be associated with a free spin, and provided in conjunction with one of the smaller sub-awards.

In another Class II or Class III embodiment, each free spin may correspond to a particular game outcome, such as any winning and/or non-winning game outcome. For example, winning and/or non-winning game outcomes may, in some embodiments, result in free spins. However, and in at least some embodiments, only winning game outcomes may result in free spins. Moreover, as described above, in some embodiments, game controller 202 may simply (randomly) award a number of free spins.

Thus, free play bonus game 300 may be implemented in Class II and Class III embodiments, and a free play trigger condition and/or a number of free spins awarded during free play bonus game 300 may be variously determined. In addition, the methods for determining the free play trigger condition and/or a number of free spins described above are merely illustrative, and it will be appreciated that other approaches are contemplated and within the scope of the present disclosure.

With continuing reference to FIG. 3, a count-up animation 302 (e.g., as opposed to a count-down) of the number of free spins awarded during free spin bonus game 300 may be displayed, such as, for example, on secondary game display 242. The count-up animation 302 may be displayed to build player excitement, such as, for example, where the player knows that a number of free spins have been awarded based upon the appearance of count-up animation 302 and/or the appearance of free spin bonus game 300 on secondary game display 242, but where the player does not know specifically how many free spins have been awarded.

In addition to count-up animation 302, a bingo card 304 may be displayed. As described above, the number of free spins awarded may correspond to a number of winning patterns occurring on bingo card 304. As those of skill will appreciate, the number of winning patterns may be determined based upon a ball call 306, which may be displayed as well. Moreover, a table or database of winning patterns may be stored in a computer memory of any of EGMs 104A-104X, such as memory 208, which may be a tangible, non-transitory, computer-readable memory.

Accordingly, to determine a number of winning patterns, bingo card 304 may be "daubed" by game controller 202 based upon the list of numbers included in ball call 306. The daubed bingo card 304 may also be displayed, such as, for example, by highlighting each daubed number. Once bingo card 304 is daubed, game controller 202 may compare the numbers daubed on bingo card 304 to every winning pattern in the database of winning patterns. Further, as described above, game controller 202 may identify and translate the number of winning patterns occurring on bingo card 304 to a number of free spins in free spin bonus game 300. For example, if eight winning patterns are identified on bingo card 304, game controller 202 may award eight free spins. Likewise, game controller 202 may not trigger free spin bonus game 300 (or display count up animation 302) until the number of winning patterns exceeds a threshold number of winning patterns. To this end, game controller 202 may, in some embodiments, count, or determine a number of, winning patterns and/or free spins awarded.

In the exemplary embodiment, a game award 308, capable of being won, may also be displayed in conjunction with free spin bonus game 300. Game award 308 may be any suitable type of game award, such as, for example, and as shown, a jackpot award and/or a progressive jackpot award. In other embodiments, game award 308 may be one or more of an additional free spin or an additional plurality of free spins, and/or an additional or different bonus game different from free spin bonus game 300. In some cases, game award 308 may correspond to a change or alteration of a symbol or symbols displayed on reels 301-305 (e.g., from the primary game and displayed on primary game display 240). In another embodiment, game award 308 may cause a multiplier or multiplication factor to be added to a monetary award in the primary game and/or to the jackpot in free spin bonus game 300. Further, in at least some embodiments, game award 308 may cause one or more wild symbols to be added to reels 301-305 in the primary game.

Thus, game award 308 may generally include any suitable award and/or game feature capable of presentation as an award or bonus. As a result, although a variety of award options are described above, it will be appreciated that any suitable game award and/or game feature may be presented and/or offered in conjunction with free spin bonus game 300.

In various embodiments, count-up animation 302 may include several components. For example, count-up animation 302 may include a central animation 310 and/or a numerical indicium 312, which may appear, depending upon a presentation desired, in one or more locations within free spin bonus game 300. Central animation 310 may include a game theme, such as, for example, a bull-riding theme, in which case, central animation 310 may depict a bull-rider riding a bull. However, other game themes are contemplated and within the scope of the present disclosure. Accordingly, the theme associated with central animation 310 may be any suitable theme and is not restricted to a bull-riding theme.

In some embodiments, the free play trigger condition and/or game award 308 described above may be associated with or tied to a game theme. For example, in the case of a bull-riding themed wagering game, the free play trigger condition and/or game award 308 may be established to correspond to a time limit associated with a bull-riding competition. Specifically, many bull-riding competitions award points based upon a number of seconds a rider is able to remain mounted on, or "ride," a bull. Commonly, riders must stay mounted on a bull for a minimum of eight seconds to be awarded points in the competition. Thus, in the embodiment described herein (which is bull-riding themed), free play bonus game 300 may not be triggered unless the number of winning bingo patterns (or more broadly, winning game outcomes) in the primary game is at least eight. Similarly, game award 308 may not be provided, even if free play bonus game 300 is configured to trigger in response to fewer than eight winning game outcomes, unless there are at least eight winning game outcomes.

Notably, in at least some embodiments, a number of winning game outcomes/free spins may exceed a number of free spins required to trigger game award 308. For example, a player may receive, in some cases, in excess of 100 free spins; however, game award 308 may trigger at eight (or any other suitable number) of free spins. In this case, numerical indicium 312 may increase or count-up beyond the number of free spins needed to trigger game award 308.

Accordingly, in some embodiments, free play bonus game 300 may not be triggered unless a number of winning outcomes (and thus free spins) exceeds a threshold number of winning outcomes and/or free spins. In contrast, and in other embodiments, free play bonus game 300 may be triggered if fewer than the threshold number of winning outcomes and/or free spins are awarded or if a different (lower) threshold number of winning outcomes and/or free spins are awarded. However, where that is the case, game award 308 may not be provided or triggered unless the number of winning outcomes and/or free spins exceeds the threshold number of winning outcomes and/or free spins. Moreover, the number of free spins awarded may exceed the number of free spins needed to trigger game award 308.

Numerical indicium 312 may be displayed and incremented, from an initial indicium number, through a plurality of intermediate indicia numbers, and to a final indicium number, to visually depict the count-up of free spins awarded in free spin bonus game 300. Specifically, numerical indicium 312 is animated as part of count-up animation 302 to visually depict an increasing number of free spins. As described above, a player may not know how many free spins have been awarded in free spin bonus game 300 but may watch as numerical indicium 312 is incremented from an initial indicium number to a final indicium number. The player may, however, know that a threshold number of free spins correspond to game award 308.

For example, if the player is playing a bull-riding themed game, as described herein, the player may understand that eight or more free spins are needed before game award 308 is awarded. Specifically, the player may review a paytable of the wagering game to gain this understanding, or more commonly, the player may infer that eight free spins correspond to game award 308 based upon knowledge gleaned from the sport of bull-riding, as described above, in which no points are awarded during competition for riding times less than eight seconds.

In the exemplary embodiment, each free spin may be provided and displayed on primary game display 240. Specifically, each time numerical indicium 312 increases or is incremented, the reels displayed on primary game display 240 may be spun or re-spun. In this manner, each re-spin may be concurrently or simultaneously displayed with each increment of numerical indicium 312, making it clear that each of the free spins awarded to the player is causing or generating a re-spin of the reels. Moreover, a delay between the display of each indicium may be approximately one second to simulate an eight second bull-riding competition. In other embodiments, the delay may be greater or less than one second.

In addition, and as described above, each free spin may, in the exemplary embodiment, correspond to a winning game outcome (such as a winning bingo pattern). Game controller 202 may, as a result, determine an award associated with each free spin (or re-spin) based upon the winning game outcome. For example, if a winning bingo pattern associated with a first free spin corresponds to an award of 100 credits (e.g., based upon a bingo paytable), game controller 202 may re-spin the reels during the first free spin, and provide an award in association with the first free spin of 100 credits. Thus, each free spin of the reels may be a winning spin, and an award provided during each free spin may correspond to an award associated with the winning bingo pattern (or more broadly, a winning game outcome) mapped or corresponding to the free spin.

In some embodiments, one or more discrete game awards, such as minor, mini, major, and/or grand game awards may be triggered or provided in association with different numbers or tiers of free spins. For example, a minor award (associated with a first value) may be triggered in response to a first number of free spins awarded (e.g., less than the number needed to trigger game award 308). Similarly, a mini award (associated with a second value greater than the first value) may be triggered in response to a second number of free spins awarded (greater than the first number of free spins), and so on through the grand award, which may be less than or the same as game award 308.

In various embodiments, one or more tiers of free spins may trigger a variety of features. As used herein a "tier" of free spins may generally indicate a number or group of free spins, such as, for example, a group of two or four free spins. A total number of allotted or awarded free spins may thus be divided into one or more tiers. For example, where a tier comprises two free spins and a player is awarded a total of eight free spins, as described above, the eight free spins may be divided into four tiers of free spins of two free spins per tier.

Accordingly, in one embodiment, a first tier of free spins may trigger a first progressive jackpot (e.g., a first progressive jackpot in a tier of progressive jackpots), and a second tier of free spins may trigger a second progressive jackpot in the tier of jackpots, and so on. Similarly, one or more tiers of free spins may be associated with one or more multipliers or multiplication factors. For example, a first tier of free spins may trigger the application of a first multiplication factor to an in-game feature, such as one or more game awards occurring in the primary game, one or more jackpots or other awards occurring in free play bonus game 300, and the like. Likewise, a second tier of free spins may trigger the application of a second, larger, multiplication factor in the same manner.

Further still, one or more tiers of free spins may trigger the application of a multiplier and/or another game enhancement for a predefined period of time. For instance, a first tier of free spins may cause any award provided to increase in value for the period of time, a second tier of free spins may cause any award to increase even further, and so on. In addition, in some embodiments, a player reaching one or more tiers of free spins may be provided a game enhancement that causes all wagers placed by the player (even minimum wagers) to function as maximum and/or increased wagers. Similarly, one or more tiers of free spins may trigger additional bonus games, and these may be provided at any point during gameplay, such as at the end of a free play bonus game 300 and/or during free play bonus game 300.

Moreover, in some embodiments, one or more tiers of free spins may be associated with one or more collectible items, such as, for example, one or more collectible or persistent game items that can be collected and saved by a player for redemption at a later stage of gameplay. In one example, a player may collect golden eggs when different levels or tiers of free spins are achieved. These golden eggs may persist during gameplay, such that the player is encouraged to collect a specified number of golden eggs in exchange for an award or prize. In addition, in at least some embodiments, numerical indicium 312 may count-down from a particular value. For example, as described herein, numerical indicium 312 may first increase to a specified value or number of free spins (e.g., four free spins) and, thereafter, decrease or count-down to a lower value. In various embodiments, a count-down may signify, for example, that the player has received a number of free spins, but that the number needed to trigger game award 308 was not reached.

Figure 4:
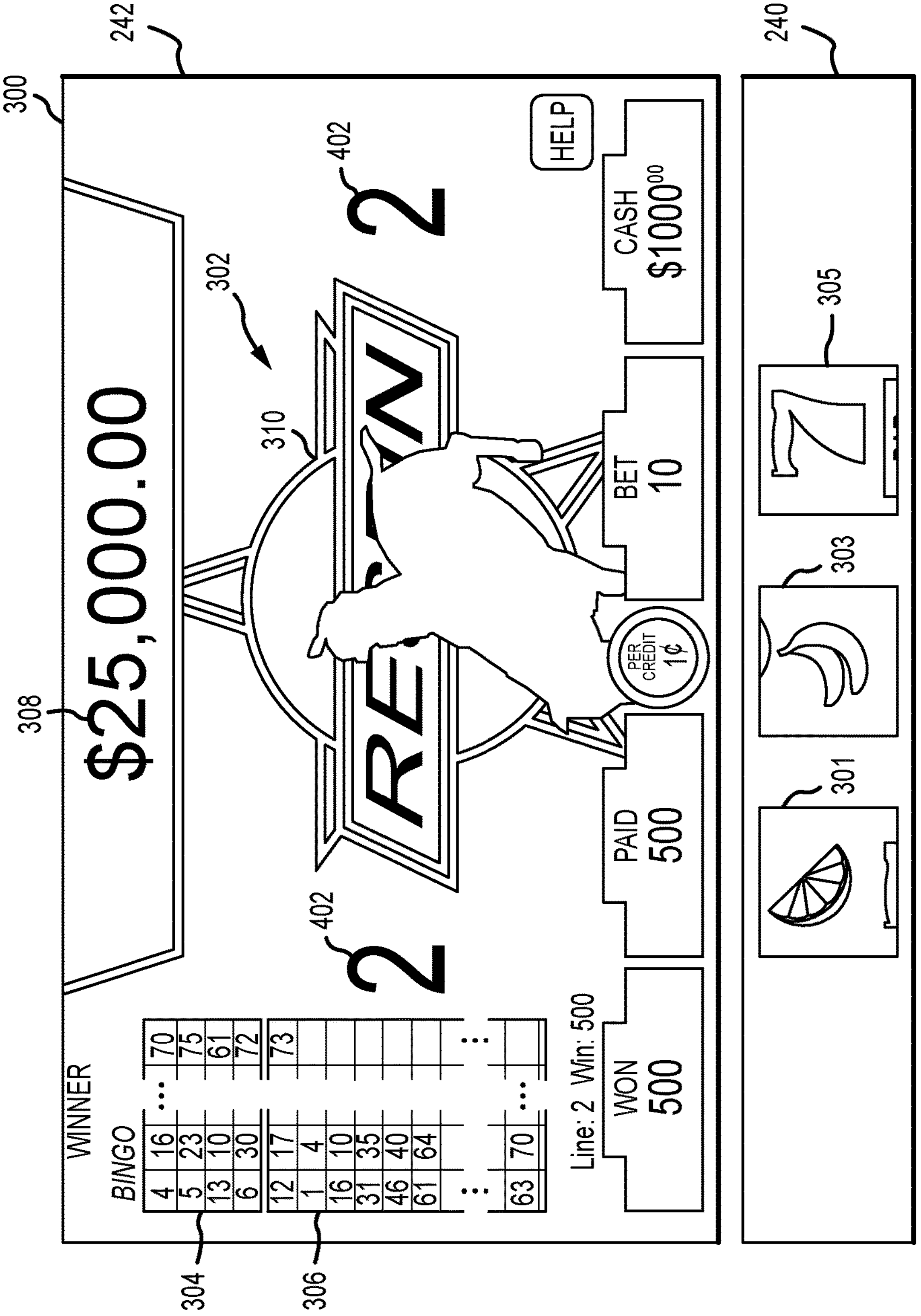
FIG. 4 is a schematic diagram of the exemplary free play bonus game, in which a first intermediate numerical indicium is displayed.
Figure 5:
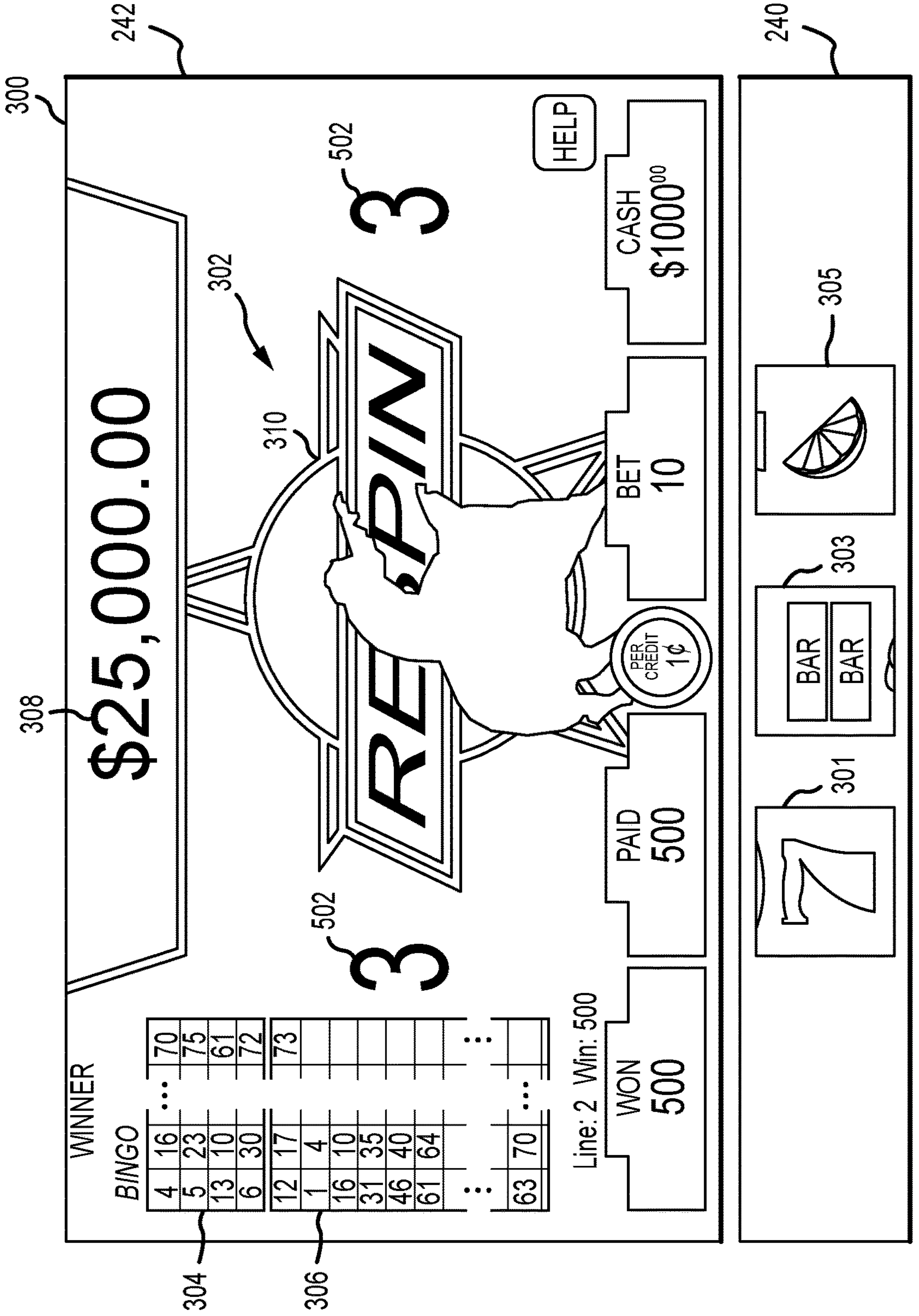
FIG. 5 is a schematic diagram of the exemplary free play bonus game, in which a second intermediate numerical indicium is displayed.

As such, game controller 202 may generate an initial free spin of the reels displayed on primary game display 240 and display, in conjunction with the initial free spin, numerical indicium 312 (which may also be referred to herein as an "initial numerical indicium"). In the exemplary embodiment, the initial free spin is a first free spin, and the initial numerical indicium 312 is the number one ("1"). As the count-up continues, game controller 202 may generate a plurality of intermediate free spins of the reels and display, in conjunction with each intermediate free spin, a plurality of intermediate numerical indicia. These intermediate free spins may count-up from the initial free spin, such that they proceed in numerical order, such as through ordinals as follows: "2," "3," "4," etc. FIGS. 4 and 5 depict such a count-up.

Figure 6:
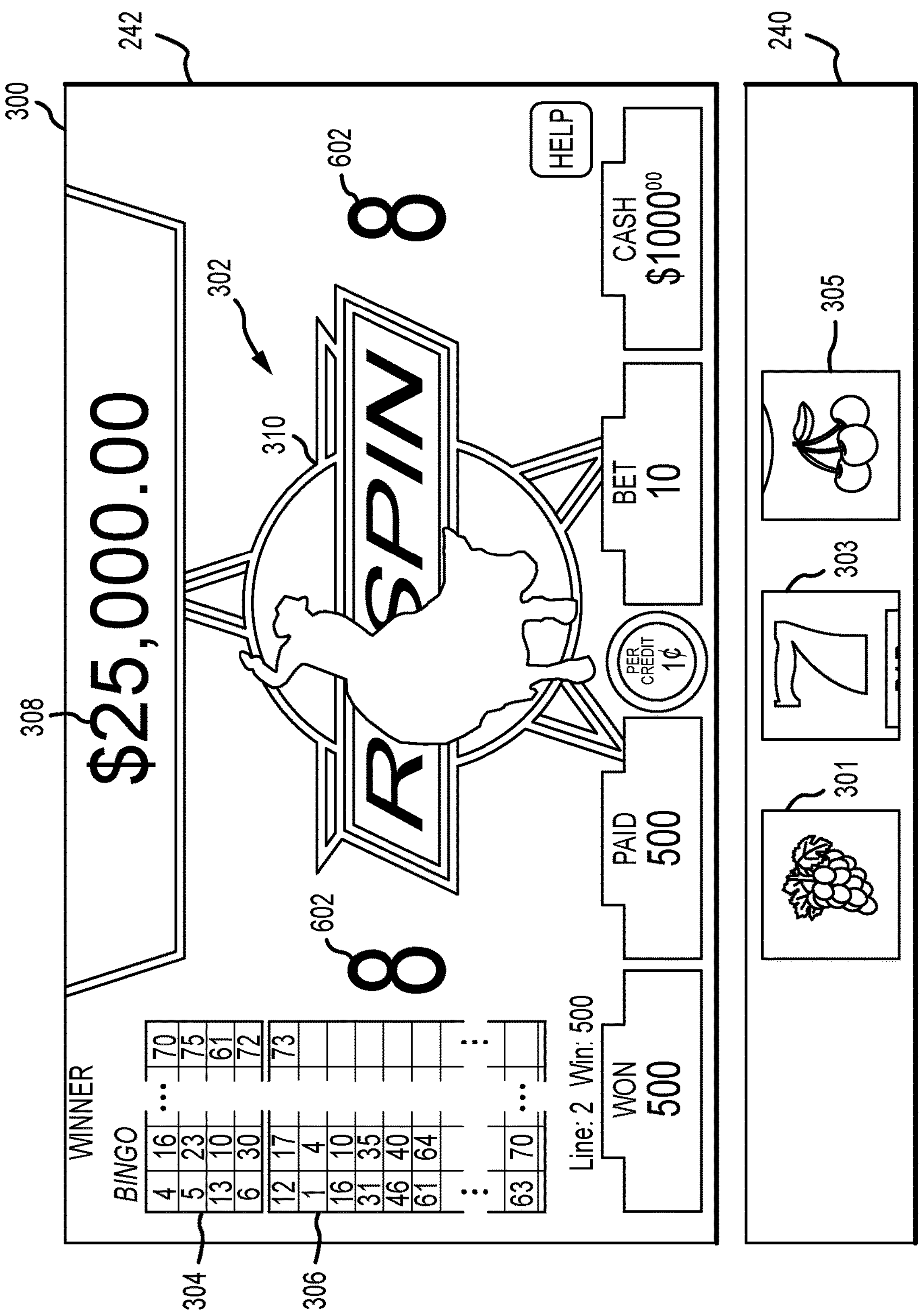
FIG. 6 is a schematic diagram of the exemplary free play bonus game, in which a final numerical indicium is displayed.

Specifically, FIG. 4 shows an intermediate numerical indicium 402 of "2." Similarly, FIG. 5 shows an intermediate numerical indicium 502 of "3." It will be appreciated that any number of intermediate numerical indicia may be displayed, depending upon a number of free spins awarded. Continuing, as shown at FIG. 6, game controller 202 may generate a final free spin of a number of free spins needed to trigger game award 308 and display, in conjunction with the final free spin of the number of free spins needed to trigger game award 308, a final numerical indicium 602. In the exemplary embodiment, final numerical indicium 602 is associated with the number "8." The count-up through the ordinals "4," "5," "6," and "7" is not shown in the Figures; however, it will be appreciated that such a count-up would occur in the progression from an indicium of "1" to an indicium of "8." Moreover, as described herein, any suitable number of free spins, and therefore any suitable number of numerical indicia, may be used to illustrate the free spin count-up. Further still, the numerical indicia displayed may continue to increase beyond final numerical indicium 602 after game award 308 is provided, such as, for example, when the player is awarded more free spins than are needed to trigger game award 308.

Figure 7:
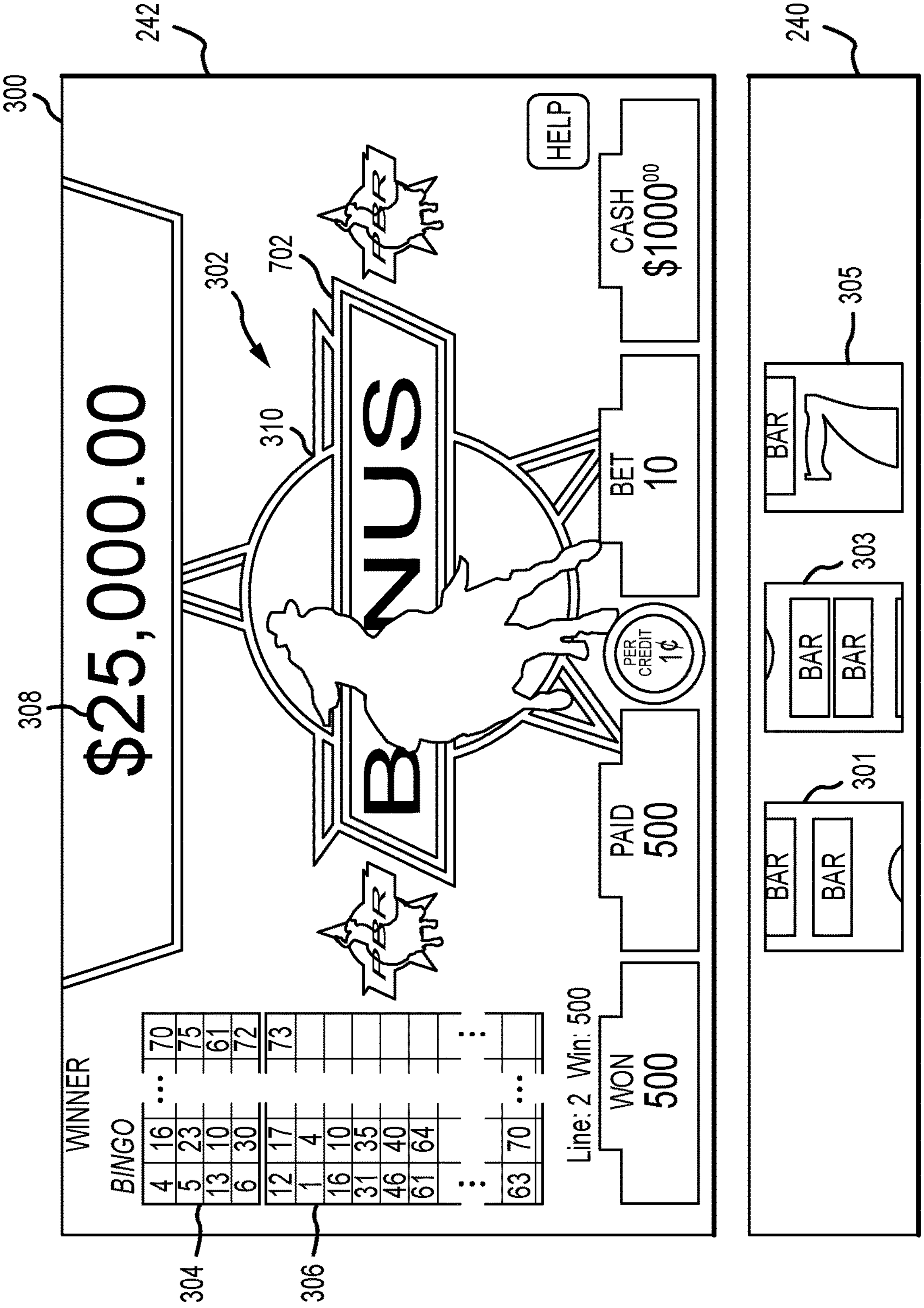
FIG. 7 is a schematic diagram of the exemplary free play bonus game, in which a bonus animation is displayed.

In the exemplary embodiment, and as shown with reference to FIG. 7, when a free spin in excess of the threshold number of free spins is reached (in this case eight free spins), a "BONUS" animation 702 may be displayed to so indicate. In addition, game award 308 may be provided or awarded to the player in conjunction with display of final numerical indicium 602 and/or in conjunction with display of the "BONUS" animation 702, which may follow shortly in response to presentation of final numerical indicium 602. As described above, the player may not necessarily know how many free spins have been awarded. However, the player may know what the threshold number of free spins is (in this case eight free spins), which may cause increased excitement as the count-up advances towards the threshold number. In the example shown, game award 308 may be a jackpot award, such as a linked progressive jackpot award. When game award 308 is won, the value of the award (e.g., in this case $25,000) may be added to the player's credit balance, and the player may be provided an option to cash out and/or return to the primary game.

Figure 8:
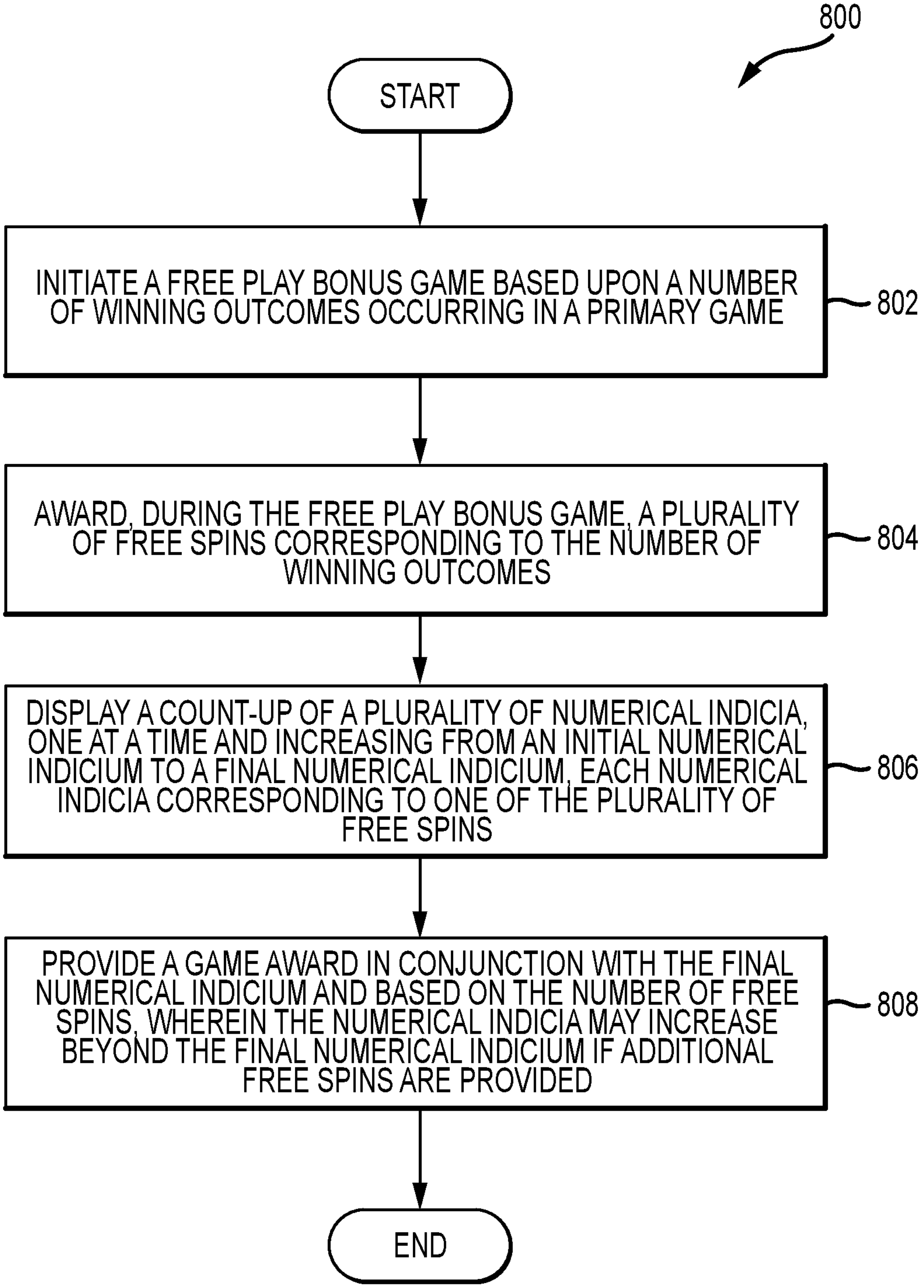
FIG. 8 is a flowchart illustrating a process of playing an electronic wagering game in which a plurality of numerical indicia are displayed, one after another, in increasing numerical order to count up from an initial numerical indicium to a final numerical indicium.

FIG. 8 is a flowchart illustrating a process 800 of playing an electronic wagering game as described above. Accordingly, in the exemplary embodiment, free play bonus game 300 may be initiated (step 802). For example, free play bonus game 300 may be initiated, as described above, when a number of winning game outcomes (e.g., winning bingo patterns) in the primary game is greater than or equal to a threshold number of winning game outcomes. In addition, a plurality of free spins may be awarded, such as, for example, based upon the number of winning bingo patterns awarded in the primary game (step 804). For instance, in at least some embodiments, the number of free spins awarded may be equal to the number of winning game outcomes. Next in the method, a plurality of numerical indicia may be displayed, one at a time and increasing from an initial numerical indicium corresponding to a first or initial free spin to a final numerical indicium corresponding to a final free spin of a plurality of free spins needed to trigger game award 308 (step 806). As described herein, the numerical indicia may continue to increase beyond the final numerical indicium after game award 308 is provided, such as, for example, when the player is awarded more free spins that needed to trigger game award 308. Finally, a game award may be provided if the number of free spins awarded is greater than or equal to a threshold number of free spins, such as, in a bull-riding themed wagering game, as described above, eight free spins (step 808).

A player may thus watch a count-up, rather than, for example, a more traditional count-down, of an unknown number of free spins towards a threshold number, which, if it is achieved, may result in the game award being provided to the player. Each free spin may, in addition, be associated with a winning game outcome, such that each free spin or re-spin of reels 301-305 causes the award associated with the winning game outcome to be provided to the player. The player may thus receive a plurality of awards during free play bonus game 300. Specifically, the player may receive each of the awards from the winning game outcomes mapped to free spins, and if the number of free spins exceeds a threshold number of free spins, the player may receive an additional game award, such as a progressive jackpot award.

A computer, controller, or server, such as those described herein, includes at least one processor or processing unit and a system memory. The computer, controller, or server typically has at least some form of computer readable non-transitory media. As used herein, the terms “processor” and “computer” and related terms, e.g., “processing device”, “computing device”, and “controller” are not limited to just those integrated circuits referred to in the art as a computer, but broadly refers to a microcontroller, a microcomputer, a programmable logic controller (PLC), an application specific integrated circuit, and other programmable circuits “configured to” carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:
at least one display device;
at least one memory with instructions stored thereon; and
at least one processor in communication with the at least one display device and the at least one memory, wherein the instructions, when executed by the at least one processor, cause the at least one processor to:
cause display of a sequential count up as a count up animation on the at least one display device, wherein the sequential count up animation includes a central animation associated with a time threshold, and wherein the sequential count up animation is displayed as counting up from an initial numerical indicium to a final numerical indicium;
in response to at least one sequential count up, cause display of at least one game outcome on the at least one display device, wherein display of the at least one game outcome is synchronized with the at least one sequential count up such that a currently displayed numerical indicium is indicative of a number of free spins having already occurred; and
cause display of the final numerical indicium, the final numerical indicium representative of a total number of free spins, wherein when the total number of free spins satisfies the time threshold, a game output is provided.

2. The electronic gaming device of claim 1, wherein the instructions further cause the at least one processor to:
determine, after each sequential count up, a current tier of free spins corresponding to a currently displayed numerical indicium on the at least one display device; and
provide, based on the current tier of free spins, a game enhancement associated with the current tier.

3. The electronic gaming device of claim 1, wherein the instructions further cause the at least one processor to:
cause display of the central animation on the at least one display device, wherein the central animation illustrates an activity associated with the time threshold, wherein the time threshold corresponds to success in the activity;
determine whether the total number of free spins satisfies the time threshold by determining whether the total number of free spins is greater than or equal to the time threshold;
cause display of a bonus animation on the at least one display device based on determining the total number of free spins is greater than or equal to the time threshold; and select the game output in response to determining the total number of free spins is greater than or equal to the time threshold.

4. The electronic gaming device of claim 3, wherein the game output comprises at least one of i) at least one additional free spin, ii) an additional bonus game, iii) a change to at least one displayed symbol, iv) addition of an award multiplier, v) addition of one or more wild symbols, or vi) a jackpot.

5. The electronic gaming device of claim 1, wherein the instructions further cause the at least one processor to:

determine, during a base game, that a free play trigger condition is satisfied, wherein the free play trigger condition is a predetermined symbol combination occurring during the base game; and cause initiation of a free play bonus game based on determining that the free play trigger condition is satisfied, wherein the free play bonus game comprises the sequential count up animation counting up from the initial numerical indicium to the final numerical indicium.

6. The electronic gaming device of claim 5, wherein the instructions further cause the at least one processor to:

determine the total number of free spins for the free play bonus game, wherein the total number of free spins is unknown to a player of the free play bonus game; and store the total number of free spins for the free play bonus game in the at least one memory.

7. The electronic gaming device of claim 6, wherein the instructions further cause the at least one processor to determine an end trigger condition is met when the sequential count up reaches the total number of free spins stored in the memory.

8. The electronic gaming device of claim 1, wherein the instructions further cause the at least one processor to:

determine whether an end trigger condition is satisfied; and based on determining that the end trigger condition is satisfied, cause display of the final numerical indicium.

9. An electronic gaming system comprising:

at least one display device;

at least one memory with instructions stored thereon; and at least one processor in communication with the at least one display device and the at least one memory, wherein the instructions, when executed by the at least one processor, cause the at least one processor to:

cause display of a sequential count up as a count up animation on the at least one display device, wherein the sequential count up animation includes a central animation associated with a time threshold, and wherein the sequential count up animation is displayed as counting up from an initial numerical indicium to a final numerical indicium;

in response to at least one sequential count up, cause display of at least one game outcome on the at least one display device, wherein display of the at least one game outcome is synchronized with the at least one sequential count up such that a currently displayed numerical indicium is indicative of a number of free spins having already occurred; and cause display of the final numerical indicium, the final numerical indicium representative of a total number of free spins, wherein when the total number of free spins satisfies the time threshold, a game output is provided.

10. The electronic gaming system of claim 9, wherein the instructions further cause the at least one processor to:

determine, after each sequential count up, a current tier of free spins corresponding to a currently displayed numerical indicium on the at least one display device; and provide, based on the current tier of free spins, a game enhancement associated with the current tier.

11. The electronic gaming system of claim 9, wherein the instructions further cause the at least one processor to:

cause display of the central animation on the at least one display device, wherein the central animation illustrates an activity associated with the time threshold, wherein the time threshold corresponds to success in the activity;

determine whether the total number of free spins satisfies the time threshold by determining whether the total number of free spins is greater than or equal to the time threshold;

cause display of a bonus animation on the at least one display device based on determining the total number of free spins is greater than or equal to the time threshold; and select the game output in response to determining the total number of free spins is greater than or equal to the time threshold.

12. The electronic gaming system of claim 11, wherein the game output comprises at least one of i) at least one additional free spin, ii) an additional bonus game, iii) a change to at least one displayed symbol, iv) addition of an award multiplier, v) addition of one or more wild symbols, or vi) a jackpot.

13. The electronic gaming system of claim 9, wherein the instructions further cause the at least one processor to:

determine, during a base game, that a free play trigger condition is satisfied, wherein the free play trigger condition is a predetermined symbol combination occurring during the base game; and cause initiation of a free play bonus game based on determining that the free play trigger condition is satisfied, wherein the free play bonus game comprises the sequential count up animation counting up from the initial numerical indicium to the final numerical indicium.

14. The electronic gaming system of claim 13, wherein the instructions further cause the at least one processor to:

determine the total number of free spins for the free play bonus game, wherein the total number of free spins is unknown to a player of the free play bonus game; and store the total number of free spins for the free play bonus game in the at least one memory.

15. The electronic gaming system of claim 14, wherein the instructions further cause the at least one processor to determine an end trigger condition is met when the sequential count up reaches the total number of free spins stored in the memory.

16. The electronic gaming system of claim 9, wherein the instructions further cause the at least one processor to:

determine whether an end trigger condition is satisfied; and based on determining that the end trigger condition is satisfied, cause display of the final numerical indicium.

17. A method of electronic gaming implemented by at least one processor in communication with at least one display device and at least one memory, the method comprising:

causing display of a sequential count up as a count up animation on at least one display device, wherein the sequential count up animation includes a central animation associated with a time threshold, and wherein the sequential count up animation is displayed as counting up from an initial numerical indicium to a final numerical indicium;

in response to at least one sequential count up, causing display of at least one game outcome on the at least one display device, wherein display of the at least one game outcome is synchronized with the at least one sequential count up such that a currently displayed numerical indicium is indicative of a number of free spins having already occurred; and causing display of the final numerical indicium, the final numerical indicium representative of a total number of free spins, wherein when the total number of free spins satisfies the time threshold, a game output is provided.

18. The method of claim 17, further comprising:

determining, after each sequential count up, a current tier of free spins corresponding to a currently displayed numerical indicium on the at least one display device; and providing, based on the current tier of free spins, a game enhancement associated with the current tier.

19. The method of claim 17, further comprising:

causing display of the central animation on the at least one display device, wherein the central animation illustrates an activity associated with the time threshold, wherein the time threshold corresponds to success in the activity;

determining whether the total number of free spins satisfies the time threshold by determining whether the total number of free spins is greater than or equal to the time threshold;

causing display of a bonus animation on the at least one display device based on determining the total number of free spins is greater than or equal to the time threshold; and selecting the game output in response to determining the total number of free spins is greater than or equal to the time threshold.

20. The method of claim 17, further comprising:

determining whether an end trigger condition is satisfied; and based on determining that the end trigger condition is satisfied, causing display of the final numerical indicium.

* * * * *